(12) United States Patent
Chapel et al.

(10) Patent No.: US 8,263,218 B2
(45) Date of Patent: Sep. 11, 2012

(54) MODIFIED SURFACES AND METHOD FOR MODIFYING A SURFACE

(75) Inventors: Jean-Paul Chapel, Princeton, NJ (US); Jean-Christophe Castaing, Burlington, NJ (US); Ling Qi, Bensalem, PA (US)

(73) Assignees: Rhodia Inc., Cranbury, NJ (US); Centre National de la Recherche Scientifique, Paris Cedex (FR)

( * ) Notice: Subject to any disclaimer, the term of this patent is extended or adjusted under 35 U.S.C. 154(b) by 692 days.

(21) Appl. No.: 12/284,980

(22) Filed: Sep. 26, 2008

(65) Prior Publication Data

US 2010/0009209 A1    Jan. 14, 2010

Related U.S. Application Data

(60) Provisional application No. 60/995,824, filed on Sep. 28, 2007.

(51) Int. Cl.
| | |
|---|---|
| *B32B 5/16* | (2006.01) |
| *B32B 17/06* | (2006.01) |
| *B32B 15/04* | (2006.01) |
| *B32B 27/00* | (2006.01) |
| *B32B 9/04* | (2006.01) |
| *B05D 3/00* | (2006.01) |
| *B05D 3/10* | (2006.01) |
| *B05D 1/36* | (2006.01) |

(52) U.S. Cl. ........ 428/323; 428/328; 428/329; 428/331; 428/411.1; 428/426; 428/457; 428/500; 427/331; 427/333; 427/402

(58) Field of Classification Search ....................... None
See application file for complete search history.

(56) References Cited

U.S. PATENT DOCUMENTS

| | | |
|---|---|---|
| 6,156,409 A | 12/2000 | Doushita et al. |
| 2005/0176863 A1* | 8/2005 | Yokota et al. .................. 524/403 |

* cited by examiner

*Primary Examiner* — Sheeba Ahmed
(74) *Attorney, Agent, or Firm* — Novak Druce + Quigg, LLP (57) ABSTRACT

A surface modified substrate includes a substrate having a surface, a layer of nanoscale inorganic oxide particles disposed on at least a portion of the surface of the substrate, said layer of nanoscale inorganic oxide particles comprising sites bearing an electric charge of a first polarity, and a monolayer of a polymer disposed on a least a portion of the layer of nanoscale inorganic oxide particles, said monolayer of polymer comprising sites bearing an electric charge of a second polarity, wherein the second polarity is the opposite of the first polarity.

17 Claims, 1 Drawing Sheet

MODIFIED SURFACES AND METHOD FOR MODIFYING A SURFACE

FIELD OF THE INVENTION

This invention relates to a modified surfaces and to a method for modifying a surface.

BACKGROUND OF THE INVENTION

Some materials, particularly polymers and ceramics, are used in applications where interactions between their surfaces with other materials are important. Surface chemical and physical properties are of primary importance in many applications, such as catalysis and drug delivery, and can be an important factor in many engineering design considerations, such as adhesion. There are known techniques, such as plasma treatment and corona discharge for modifying the chemical and/or physical properties of the surface of a substrate. However, in many cases, such as modification of polymer surfaces, the effects of high energy treatments tend to dissipate over time and the surface modification imparted thereby is of limited durability.

Accordingly, there is a need more durable surface modification techniques.

SUMMARY OF THE INVENTION

In a first aspect, the present invention is directed to a surface modified substrate, comprising:
(a) a substrate having a surface,
(b) a layer of nanoscale inorganic oxide particles disposed on at least a portion of the surface of the substrate, said layer of nanoscale inorganic oxide particles comprising sites that bear an electric charge of a first polarity, and
(c) a monolayer of a polymer disposed on a least a portion of the layer of nanoscale inorganic oxide particles, said monolayer of copolymer comprising sites that bear an electric charge of a second polarity, wherein the second polarity is the opposite of the first polarity.

In a second aspect, the present invention is directed to a method for modifying the surface of a substrate, comprising the steps of:
a) treating at least a portion of such surface with a slurry of nanoscale inorganic oxide particles to deposit a quantity of such particles on such portion of such surface wherein nanoscale inorganic oxide particles have a first net electrical charge, and
b) treating the nanoscale inorganic oxide particle treated surface with an aqueous solution or dispersion of a polymer that comprises units bearing a second net electrical charge at a pH wherein the polarity of the second net electrical charge is the opposite of the polarity of the first net electrical charge.

The method allows modification of surfaces to provide desired functionalities, such as for example, antifouling, drag reducing, water sheeting, antisoiling, anti-deposition, or anti-radiation properties onto all kinds of surfaces.

DETAILED DESCRIPTION OF INVENTION

As used herein, the term "electric charge" means an electrical imbalance, resulting from, in the case of a negative electric charge, an excess or high relative density of electrons, and in the case of a positive electrical charge, a deficiency or low relative density of electrons, in each case relative to the number or density of protons within a given frame of reference.

As used herein in reference to an object, such as a surface, a polymer, or a particle, the term "net electric charge" means of the result obtained by arithmetically summing of all of the positive and negative electric charges on the relevant interface of the object, typically, an external surface of the object. Net electric charge and the net electric charge of the surface can be quantified by measuring the streaming potential of the surface according to known methods, such as that described in "Zeta Potential in Colloid Science" (Colloid Sciences Series) by Robert J. Hunter, Academic Pr; New Ed edition (January 1989) pp. 59-129.

As used herein in reference to an electric charge, the term "polarity" means the particular state, that is, either "positive" or "negative", of the electrical charge.

In many cases, the polarity of a net electric charge can be reliably predicted without calculating or measuring the net electric charge, based on a qualitative assessment of the relative amounts of cationic and anionic sites on the relevant interface of an object. For example, the polarity of the net electric charge of a surface bearing a predominance of anionic sites would be negative. Similarly, the polarity of the net electrical charge of a surface bearing a predominance of cationic sites would be positive.

As used herein, the indication that the polarity of a second net electrical charge is the "opposite" of the polarity of a first net electrical charge means that polarity of one of the respective net electrical charge is negative and the polarity of the other net electrical charge is positive.

As used herein in reference to a polymer disposed on a surface of a layer of nanoscale inorganic oxide particles, the term "monolayer" means a layer of the polymer wherein at least a portion of each molecule of the copolymer is in direct contact with the surface of the layer of nanoscale inorganic oxide particles. Typically, the average thickness of a monolayer of polymer would correspond to an average characteristic dimension of the polymer molecule.

Figure 1:
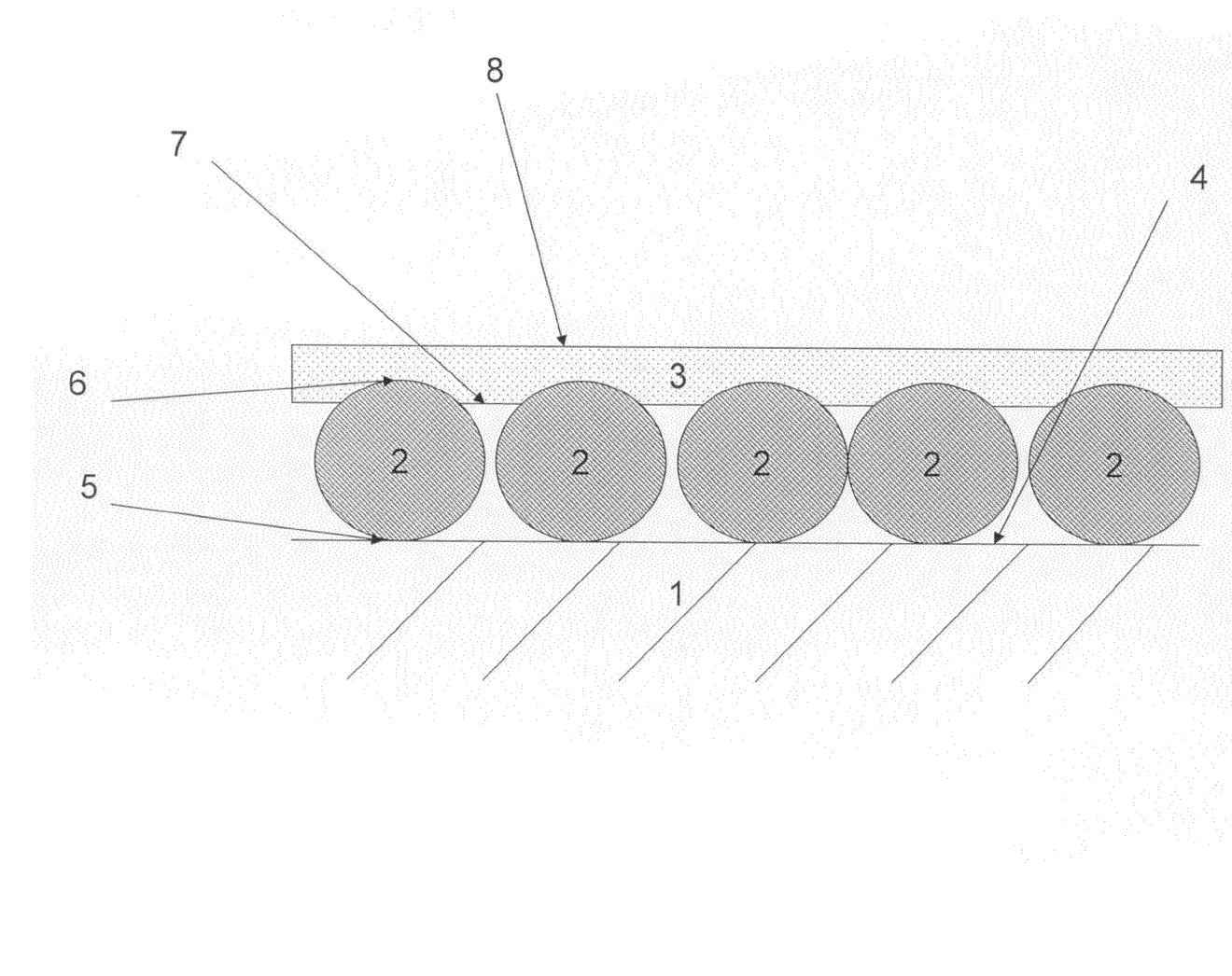
FIG. 1 shows a schematic cross-sectional view of one embodiment of a surface modified substrate according to the present invention.

The following descriptions refer to the schematic cross sectional diagram of the embodiment of a surface modified substrate according to the present invention shown in FIG. 1.

It is believed that the monolayer of polymer (3) adheres to the layer of nanoscale inorganic particles (2) due to electrostatic forces arising from attraction between the electrically charged sites of a first polarity on the nanoscale inorganic particles (2) with the electrically charged sites of opposite polarity on the polymer layer (3).

In one embodiment, the layer of nanoscale inorganic particles (2) has a first surface (5) in contact with the surface (4) of the substrate (1) and second surface (6) oriented away from the surface (4) of the substrate (1). Prior to deposition of the monolayer of polymer (3), the second surface (6) of the layer of nanoscale inorganic particles is a "free" surface that is available for contacting with the aqueous polymer solution or dispersion, form which the polymer is deposited.

In one embodiment, the electrically charged sites of the second surface (6) of the layer of nanoscale inorganic particles (2) have a negative polarity and the electrically charged sites of the polymer have a positive polarity.

In one embodiment, the electrically charged sites of second surface (6) of the layer of nanoscale inorganic particles (2) have a positive net polarity and the electrically charged sites of the polymer have a negative polarity.

In one embodiment, the second surface (6) of the layer of nanoscale particles (2) comprises an amount of electrically charged sites having a first polarity effective to impart a net electric charge of the first polarity to the second surface layer of nanoscale inorganic oxide particles.

In one embodiment, the monolayer of polymer (3) has a first surface (7) in contact with the second surface (6) of the layer of nanoscale inorganic oxide particles (2) and the first surface (7) of the monolayer of polymer (3) comprises an amount of electrically charged sites having a second polarity effective to impart a net electric charge of the second polarity to the first surface (7) of the monolayer of polymer (3).

In one embodiment, the second surface (6) of the layer of nanoscale inorganic particles (2) has a negative net electric charge and the first surface (7) of the layer of polymer (3) has a positive net electric charge.

In one embodiment, wherein the second surface (6) of the layer of nanoscale inorganic particles (2) have a positive net electric charge and the first surface of the layer of polymer has a negative net electric charge.

In one embodiment, the monolayer of polymer (3) is a discontinuous layer. As used herein in reference to the monolayer of polymer (3), the term "discontinuous" means that the monolayer includes void through which the layer of inorganic nanoparticles (2) is partially exposed, defined between or among areas in which the layer of inorganic nanoparticles is covered by monolayer of polymer (3).

In one embodiment, the monolayer of polymer (3) is at least substantially continuous, more typically, is continuous. As used herein in reference to an area of the monolayer of polymer (3), the term "continuous" means that the monolayer of polymer (3) covers the layer of inorganic nanoparticles (2) in that area, with no void spaces.

In one embodiment, the monolayer of polymer (3) has a second surface (8) oriented away from the layer of nanoscale inorganic oxide particles (2).

In one embodiment, the second surface (8) of the monolayer of polymer (3) comprises an amount of electrically charged sites of a first polarity effective to impart a net electric charge of the first polarity to the second surface (8) of the monolayer of polymer (3). In those embodiments wherein electrically charged sites are also present on the second surface (8) of the monolayer of polymer (3), either or both steps of the process of the present invention can be repeated to build up stacked layers of nanoparticles and copolymers on the surface of the substrate.

In one embodiment, the second surface (8) of the monolayer of polymer comprises an amount of non-polar sites effective to render the surface of the polymer layer at least substantially non-polar.

(a) Substrate

The modification process of the present invention is not sensitive to the surface chemical and physical properties of the substrate and the substrate of the present invention may be any solid material.

In one embodiment, the substrate is an organic polymer, an organosilicon polymer, a ceramic, a metal, a composite material, or an inorganic material other than a ceramic or metal. Suitable organic polymers include homopolymers, random copolymers, block copolymers, and polymer blends such as polyolefins, such as polyethylene, polypropylene, and polystyrene, polyacrylates, such as polymethylmethacrylate, halogenated polymers, such a polytetrafluoroethylene, conducting polymers such as polyacetylenes, polypyrroles, polythiophenes, polyanilines, polyfluorenes, poly(3-hexylthiophene), polynaphthalenes, poly(p-phenylene sulfide), poly(para-phenylene vinylene)s, engineering plastics such as polyamides, poly(ether ketones), polyimides, polycarbonates, polyesters and polyurethanes. Suitable organosilicon polymers include, for example, polydimethylsiloxane. Suitable ceramics include, for example, alumina, zirconia, silica, silicone carbide, silicon nitride. Suitable metals include chromium, aluminum, iron, nickel, copper, platinum, paladium, gold and alloys of the above metals. Suitable composites include, for example, fiber or particle reinforced polymers, such as silica filled ethylene propylene diene rubber, carbon nanotube-polymer composites and metal particulate-filled polymers. Additional substrates also include materials such as fused glass, quartz, calcium fluoride, mica, silicon, germanium and indium tin oxide The substrate may be of any physical configuration, such as a shaped article, including for example, fibers, flat or shaped sheets, hollow tubes, spheres, or as a layer, which may be continuous or discontinuous, supported on a second substrate.

In one embodiment, the surface of the substrate has a root mean square ("RMS") surface roughness of less than about 200 nm, more typically from about 100 to about 200 nm.

(b) Layer of Nanoscale Inorganic Particles

In one embodiment the substrate has an RMS surface roughness of less than about 10 nm, more typically less than about 2 nm.

As used herein the terminology "primary particle" means a single discrete particles and the terminology "secondary particle" means an agglomerate of two or more primary particles. A reference to "particles" that does not specify "primary" or "secondary" means primary particles, or secondary particle, or primary particles and secondary particles.

As used herein, the term "nanoscale" in reference to particles means that the particles have a mean particle diameter ("$D_{50}$") of from about 1 to about 1000 nanometers ("nm"). In one embodiment, the nanoscale primary particles have a $D_{50}$ of from about 5 to about 1000 nm, even more typically from about 10 to about 800 nm, and still more typically from about 20 to about 500 nm. In one embodiment, the nanoscale primary particles have a $D_{50}$ of from about 1 to about 500 nm, even more typically from about 1 to about 100 nm, and still more typically from about 1 to about 50 nm. Particle size may be determined using dynamic light scattering.

Suitable inorganic oxides include oxides of single elements, such as cerium oxide, titanium oxide, zirconium oxide, halfnium oxide, tantalum oxide, tungsten oxide and bismuth oxide, zinc oxide, indium oxide, and tin oxide, iron oxide, silica, and mixtures of such oxides, as well as oxides of mixtures of such elements, such as cerium-zirconium oxides.

The inorganic oxide particles may further comprise linked or absorbed ions, such as, for example, metal ions, nitrate ions.

In one embodiment, the inorganic oxide is a crystalline solid. More typically, aqueous sols of particles of the inorganic oxide are stabilized by electrostatic charges and/or hydrostatic forces and subject to destabilization by perturbations of pH, ionic strength, and concentration. Such inorganic oxides are typically synthesized under highly acidic or highly basic reaction conditions.

In one embodiment, the inorganic oxide is selected from iron oxide, zirconium oxide and cerium oxide. More typically, the inorganic oxide is cerium oxide.

Methods for making suitable inorganic oxide particles are known, such as sol-gel techniques, direct hydrolysis of metal alkoxides by water addition, forced hydrolysis of metal salts or by reaction of metal alkoxides with metal halides.

In one embodiment, the nanoscale inorganic oxide particles are made by precipitation of a cerium salt.

In one embodiment, the nanoscale inorganic oxide particles are initially present in the form of a sol, also termed a "slurry", of such particles dispersed in an aqueous medium. Typically, the aqueous medium comprises at least 40 wt %, more typically at least 50 wt % water and even more typically at least 60 wt % water. In one embodiment, the aqueous medium consists essentially of water. The aqueous medium may optionally further comprise one or more water miscible organic liquids, such as for example, tetrahydrofuran, N,N-dimethylformamide, acetonitrile, acetone, $(C_1-C_8)$alkanols such as methanol, ethanol, 2-propanol and diols such as ethylene glycol or, propylene glycol.

In one embodiment, the aqueous medium of the sol comprises, based on 100 parts by weight ("pbw") of such aqueous medium, from about 0 to about 100 pbw, more typically from about 40 to about 100 pbw, and still more typically from about 50 to about 100 pbw water, and from 0 to about 90 pbw, more typically from 0 to about 60 pbw, and still more typically from about 0 to about 50 pbw, of one or more water miscible organic liquids.

The sol exhibits, at least initially, a pH effective to provide a stable sol, that is, a sol wherein the nanoscale inorganic oxide particles tend to remain dispersed in the aqueous medium. In one embodiment, the nanoscale inorganic oxide particle slurry is a stable slurry that comprises nanoscale cerium oxide particles and exhibits a pH of less than or equal to about 2. In another embodiment, the nanoscale inorganic oxide particle slurry is a stable slurry that comprises nanoscale silicon oxide particles and exhibits a pH of from about 7.5 to about 8.5.

In one embodiment, nanoscale inorganic oxide particles are deposited on a surface of the substrate by contacting the surface with a stable nanoscale inorganic oxide particle sol and then adjusting the pH of the sol to destabilize the sol and cause precipitation of nanoscale inorganic oxide particles from the sol onto the surface.

In one embodiment, the sol comprises, based on the total weight of the sol, from greater than 0 to about 10 percent by weight (wt %"), more typically from about 0.01 to about 5 percent by weight nanoscale inorganic oxide particles. In one embodiment, the sol comprises from about 0.01 to about 1.0 wt %, and still more typically from about 0.01 to about 0.5 wt %, nanoscale inorganic oxide particles.

In one embodiment, the pH of the stable sol is initially less than or equal to about 2, more typically less than or equal to about 1.5, and is adjusted to a value from about 3 to about 14, more typically from about 4 to about 12, and even more typically from about 5 to about 8, to precipitate the nanoscale inorganic particles from the sol.

In one embodiment, the pH of the stable sol is initially greater than or equal to about 10, more typically greater than or equal to about 11, and is adjusted to a value of about 1 to about 9, more typically from about 4 to about 9, and even more typically from about 5 to about 8, to precipitate the nanoscale inorganic particles from the sol.

In one embodiment, the aqueous medium of the sol further comprises a dissolved electrolyte, in an amount effective to encourage deposition of particles from the sol onto the surface of the substrate without destabilizing the sol. While not wishing to be bound by theory, it is believed that the presence of the electrolyte reduces electrostatic interactions among the nanoscale inorganic oxide particles of the sol and prevents the buildup of an electrostatic charge as nanoscale inorganic oxide particles deposit from the sol onto the surface of the substrate. In one embodiment, the effective amount of electrolyte is from greater than 0 to about 1 pbw, more typically from about 0.01 to about 0.1 pbw electrolyte, per 100 pbw of the aqueous medium, that is, of the combined amount of the water and any water miscible organic liquid components of the sol.

Suitable electrolytes are those that do not destabilize the sol when present in an amount effective to encourage deposition of particles from the sol onto the surface of the substrate and include organic salts, inorganic salts, and mixtures thereof. The electrolyte typically comprises a salt having a cationic component and an anionic component. Suitable cations may be monovalent or multivalent, may be organic or inorganic, and include, for example, sodium, potassium, lithium, calcium, magnesium, cesium, and lithium cations, as well as mono-, di- tri- or quaternary ammonium or pyridinium cation. Suitable anions may be a monovalent or multivalent, may be organic or inorganic, and include, for example, chloride, sulfate, nitrate, nitrite, carbonate, citrate, cyanate acetate, benzoate, tartarate, oxalate, phosphate, and phosphonate anions. Suitable electrolytes include, for example, salts of multivalent anions with monovalent cations, such as potassium pyrophosphate, potassium tripolyphosphate, and sodium citrate, salts of multivalent cations with monovalent anions, such as calcium chloride, calcium bromide, zinc halides, barium chloride, and calcium nitrate, and salts of monovalent cations with monovalent anions, such as sodium chloride, potassium chloride, potassium iodide, sodium bromide, ammonium bromide, alkali metal nitrates, and ammonium nitrates.

In one embodiment, the electrolyte comprises one or more of salts of multivalent anions with monovalent cations and monovalent cations with monovalent anions.

In one embodiment, the electrolyte comprises a monovalent cationic component and a monovalent or multivalent anionic component. In one embodiment, the electrolyte comprises a nitrate salt. Suitable nitrate salts include alkali metal nitrate salts, such as sodium nitrate and potassium nitrate, as well as ammonium nitrate, or a mixture thereof.

In one embodiment, the stable nanoscale inorganic oxide particle sol that contains an electrolyte and nanoscale inorganic oxide particles are deposited from the sol onto a surface of a substrate by contacting the surface with the stable electrolyte-containing nanoscale inorganic oxide particle sol.

In one embodiment, the sol is a stable electrolyte-containing nanoscale cerium oxide particle sol and exhibits a pH that is less than or equal to about 2, more typically less than or equal to about 1.5.

The surface of the substrate is contacted with the stable electrolyte-containing nanoscale inorganic oxide particle sol and the surface is subsequently rinsed in an aqueous rinse solution.

In one embodiment, the surface of the substrate is contacted with the sol by immersing the substrate in the sol.

The surface of the substrate is contacted with the sol for a period of time effective to allow deposition of a quantity of nanoscale inorganic oxide particles from the sol onto at least a portion of the surface the substrate. For a given sol, longer contact time typically results in deposition of a greater quantity of particles from the sol onto the surface of the substrate. In one embodiment, sufficient contact time is any time greater than 0 seconds, more typically from greater than 0 seconds to about 100 hours. In one embodiment, the contact time is from greater than 0 seconds to about 24 hours, more typically from greater than or equal to about 1 second to about 5 hours, and even more typically from about 10 seconds to about 1 hour.

In general, the time period between discontinuing contact of the treated surface with the sol and rinsing the treated surface is not critical. In one embodiment, the treated surface is rinsed to remove any poorly adhered nanoscale inorganic oxide particles from the treated surface. Typically, contact of the surface with the sol is discontinued and the surface is rinsed with the aqueous rinse solution immediately or substantially immediately after the contact of the surface with the sol is discontinued. Optionally, the treated surface may be allowed to dry during the time period after contact of the surface with the sol is discontinued and prior to rinsing.

The aqueous rinse solution comprises water and may, optionally, further comprise up to about 70 wt %, more typically up to about 30 wt %, of a water miscible organic liquid.

In one embodiment, the rinse solution further comprises an electrolyte in an amount effective to discourage desorption of the deposited nanoscale inorganic oxide particles from the treated surface, which is typically from greater than 0 to about 1 wt %, more typically from about 0.01 wt % to about 0.1 wt %, of an electrolyte.

The pH of the rinse solution is not critical. In one embodiment, wherein the nanoscale inorganic oxide particles of the sol are nanoscale cerium oxide particles, the rinse solution exhibits a pH of greater than or equal to 7, more typically, from 7 to about 12, and is more typically from about 10 to about 12.

In one embodiment, the layer of nanoscale particles on the surface is a monolayer. As used herein in reference to nanoscale inorganic particles, the term "monolayer" of means a layer that is one particle thick.

In one embodiment, the layer of nanoscale particles on the hydrophobic surface is a discontinuous layer of particles. As used herein in reference to a layer of particles, the term "discontinuous" means that the layer includes regions of void space defined between discrete particles and/or between regions of more closely packed particles.

In one embodiment, the layer of nanoscale particles on the hydrophobic surface is an at least substantially continuous layer of particles. As used herein in reference to a monolayer of particles, the term "continuous" means that the particles of the layer are closely packed so that a typical particle of the layer is substantially surrounded by and in contact with other particles of the layer.

In one embodiment, the substrate containing the deposited inorganic particles may be annealed for extended periods of time at temperatures between 298° K and 773° K, more typically between 298° K and 473° K and even more typically between 298° K and 298° K in an environment that may or may not be saturated with water vapor The inorganic oxide particles may comprise surface hydroxyl groups available to undergo condensation with hydroxyl groups of adjacent particles of the layer to form covalent bonds between such particles.

In one embodiment, the layer of nanoscale particles on the surface is an at least substantially continuous monolayer of particles, wherein a typical particle of the layer is substantially surrounded by, in contact with, and bonded to other particles of the monolayer.

The layer of nanoscale inorganic oxide particles modifies the chemical and/or physical properties, for example, the chemical reactivity and/or the surface energy, of the surface modified substrate of the present invention.

In one embodiment, the surface modified substrate is a hydrophilized substrate, comprising a substrate initially having a hydrophobic surface and a layer of nanoscale inorganic oxide particles disposed on at least a portion of such hydrophobic surface in an amount effective to increase the hydrophilicity of such portion of such hydrophobic surface.

As used herein, "hydrophobic surface" means a surface that exhibits a tendency to repel water and to thus resist being wetted by water, as evidenced by a contact angle with water of greater than or equal to 700, more typically greater than or equal to 900, "hydrophilic surface" means a surface that exhibits an affinity for water and to thus be wettable by water, as evidenced by a contact angle with water of less than 70°, more typically less than 60°, and even more typically less than 20°, and "hydrophilizing" a hydrophobic surface means rendering the surface more hydrophilic and thus less hydrophobic, as indicated by a decreased contact angle with water, wherein in each case, the contact angle with water is measured by a conventional image analysis method, that is, by disposing a droplet of water on the surface, typically a substantially flat surface, at 25° C., photographing the droplet, and measuring the contact angle shown in the photographic image.

One indication of increased hydrophilicity of a treated hydrophobic surface is a decreased contact angle of water droplets with a treated surface compared to the contact angle of water droplets with an untreated surface. Water droplet contact angle is awkward to determine with respect to a typical fiber due to the fiber surface configuration, which is due to the lack of a substantially flat surface. A water droplet contact angle measurement that is representative of the fiber surface can conveniently be made using a flat sheet or sample coupon of same material as the fiber of interest. Typically, the treated surface exhibits a water droplet contact angle of less than 70°, more typically less than 60°, even more typically, less than 45°.

In one embodiment, an untreated hydrophobic substrate having an advancing water drop contact angle ($\theta_a$) of greater than or equal to about 70°, more typically greater than or equal to 800 and following surface modification according to the present invention exhibits an advancing water contact angle ($\theta_a$) of less than or equal to about 40°, more typically less than or equal to about 20°, and a receding water contact angle ($\theta_r$) of less than or equal about 60°, more typically less than or equal to about 45°.

The hydrophilic properties imparted by surface modification according to the present invention are quite durable and hydrophilically modified substrates according to the present invention maintain a $\theta_a$ of less than 45° and a $\theta_r$ of less than 20° following treatment. This is in contrast to hydrophobic recovery of the amorphous region for polymers such as polypropylene that is typically seen after classic treatments, such as plasma and bulk functionalization. The organic oxide layer of the surface modified substrate of the present invention layer acts as if strongly anchored to the underlying surface and cross-linked in the oxide layer plane, apparently hindering any free energy minimization-driven reorganization of the underlying surface.

Suitable substrates having hydrophobic surfaces include polyolefin substrates, such as polyethylene, polypropylene, and polystyrene, polyacrylate substrates, such as polymethylmethacrlate, halogenated polymer substrates, such as polytetrafluoroethylene, and organosilicon polymer substrates such as polydimethylsiloxane.

In one embodiment, the substrate is a polyolefin sheet or shaped polyolefin article, such as, for example, a component of an automobile.

In each case, the surface treatment is durable and resists desorption from the substrate in the presence of water.

(c) Monolayer of Polymer

In one embodiment, the polymer comprises one or more homopolymers, each of which is homopolymer of monomeric units, each of which bear an electrically charged substituent group, typically an ionic substituent group, that is, a cationic substituent group or an ionic substituent group. In one embodiment, the polymer comprises one or more polycationic homopolymers, each of which is a homopolymer of cationic monomeric units, each of which bear a cationic substituent group. In one embodiment, the polymer comprises one or more polyanionic homopolymers, each of which is a homopolymer of anionic monomeric units, each of which bear an anionic substituent group.

In one embodiment, the polymer comprises one or more copolymers that comprises an electrically charged part A and electrically neutral part B. In one embodiment, the polymer comprises one or more polycationic copolymers, each of which is a copolymer comprising cationic monomeric units, each of which bear a cationic substituent group, and neutral monomeric units. In one embodiment, the polymer comprises one or more polyanionic copolymers, each of which is a copolymer comprising anionic monomeric units, each of which bear an anionic substituent group, and neutral monomeric units.

The polymer can be any suitable copolymer comprising polar portions and neutral portions. Typically, the polar portions of the copolymer are ionic substituent groups that ionize in an aqueous medium to form electrically charged sites on the copolymer. For example, the copolymer may be a block copolymer or comb copolymer. In one embodiment, the copolymer is a block copolymer comprising at least two blocks described herein as part A and part B, whereby part A corresponds to one block, and part B corresponds to another block. Part A may also optionally comprise a composition gradient. Typically, comb copolymers or grafted copolymers, in accordance with the invention comprise a backbone and side chains, described herein as part A and part B, whereby part A corresponds to the backbone and part B corresponds to side chains, or vice versa.

In one embodiment, the copolymer is a block copolymer that comprises at least two different blocks, block A, and block B, part A being polyionic and part B being neutral in pH conditions of said copolymer solution.

Part A of the copolymer is defined by the repeating units it comprises. A part may be defined by naming a polymer, or by naming monomers it is derived from. In the present specification, a unit deriving from a monomer is understood as a unit that may be directly obtained from the said monomer by polymerizing. Part A may be a copolymer, comprising several kind of repeating units, deriving form several monomers. Hence, part A and part B are different polymers, deriving from different monomers, but they may comprise some common repeating units (copolymers). Part A and part B typically do not comprise more than 50% of a common repeating unit (derived from the same monomer).

In one embodiment, part A is polyionic (polyanionic or polycationic) in pH conditions of the formulation. That means that part A comprises ionic (anionic or cationic) repetitive units regardless of the pH, or that part A comprises repetitive units that may be neutral or ionic (anionic or cationic) depending on the pH of the formulation (the units are potentially ionic). A unit that may be neutral or ionic (anionic or cationic), depending on the pH of the composition, will be thereafter referred to as an ionic unit (anionic or cationic), or as a unit deriving from an ionic monomer (anionic or cationic), whenever it is in a neutral form or in an ionic form (anionic or cationic). Suitable copolymer are described in US published application 2005/0176863 and in U.S. application Ser. No. 11/445,115 filed on Jan. 6, 2006, U.S. Pat. No. 6,933,340, both applications and patent being also incorporated by reference in the present description.

In one embodiment, the homopolymer or part A of the copolymer is polycationic and comprises monomeric units derived from cationic monomers. Some preferred cationic monomers comprise an ammonium group of formula—$NR_3^+$, wherein R, which is identical or different, represents a hydrogen atom, an alkyl group comprising 1 to 10 carbon atoms, or a benzyl group, optionally carrying a hydroxyl group, and may comprise an anion (counter-ion). Examples of anions are halides such as chloride and bromides, sulphates, hydrosulphates, alkylsulphates (for example comprising 1 to 6 carbon atoms), phosphates, citrates, formates, and acetates.

Suitable cationic monomers include, for example:

aminoalkyl (meth)acrylates, aminoalkyl (meth)acrylamides, monomers, including particularly (meth)acrylates, and (meth)acrylamides derivatives, comprising at least one secondary, tertiary or quaternary amine function, or a heterocyclic group containing a nitrogen atom, vinylamine or ethylenimine;

diallyldialkyl ammonium salts; and their mixtures, their salts, and macromonomers deriving from therefrom.

Specific examples of cationic monomers include:

dimethylaminoethyl (meth)acrylate, dimethylaminopropyl (meth)acrylate, ditertiobutylaminoethyl (meth)acrylate, dimethylaminomethyl (meth)acrylamide, dimethylaminopropyl (meth)acrylamide;

ethylenimine, vinylamine, 2-vinylpyridine, 4-vinylpyridine;

trimethylammonium ethyl (meth)acrylate chloride, trimethylammonium ethyl (meth)acrylate methyl sulphate, dimethylammonium ethyl (meth)acrylate benzyl chloride, 4-benzoylbenzyl dimethylammonium ethyl acrylate chloride, trimethyl ammonium ethyl (meth)acrylamido (also called 2-(acryloxy)ethyltrimethylammonium, TMAEAMS, or Padamquat) chloride, trimethylammonium ethyl (meth)acrylate (also called 2-(acryloxy)ethyltrimethylammonium, TMAE-AMS, or Padamquat) methyl sulphate, trimethyl ammonium propyl (meth)acrylamido chloride, vinylbenzyl trimethyl ammonium chloride, diallyldimethyl ammonium chloride, monomers having the following formula:

wherein $R_1$ is a hydrogen atom or a methyl or ethyl group;

$R_2$, $R_3$, $R_4$, $R_5$ and $R_6$, which are identical or different, are linear or branched $C_1$-$C_6$, typically $C_1$-$C_4$, alkyl, hydroxyalkyl or aminoalkyl groups;

m is an integer from 1 to 10, for example 1;

n is an integer from 1 to 6, typically 2 to 4;

Z represents a —C(O)O— or —C(O)NH— group or an oxygen atom;

A represents a $(CH_2)_p$ group, p being an integer from 1 to 6, typically from 2 to 4;

B represents a linear or branched $C_2$-$C_{12}$, advantageously $C_3$-$C_6$, polymethylene chain optionally interrupted by one or more heteroatoms or heterogroups, in particular O or NH, and optionally substituted by one or more hydroxyl or amino groups, typically hydroxyl groups; and X, which are identical or different, represent counter-ions, and their mixtures, and macromonomers deriving therefrom.

In another embodiment of the invention, the homopolymer or part A of the copolymer is polyanionic and comprises monomeric units deriving from anionic monomers. Suitable anionic monomers include, for example:

alpha-ethylenically-unsaturated monomers comprising a phosphate or phosphonate group, alpha-ethylenically-unsaturated monocarboxylic acids, monoalkylesters of alpha-ethylenically-unsaturated dicarboxylic acids, monoalkylamides of alpha-ethylenically-unsaturated dicarboxylic acids, alpha-ethylenically-unsaturated compounds comprising a sulphonic acid group, and salts of alpha-ethylenically-unsaturated compounds comprising a sulphonic acid group.

In one embodiment, the anionic monomeric units of the polymer are derived from one or more anionic monomer selected from the group consisting of:

acrylic acid, methacrylic acid, salts of acrylic acid, salts of methacrylic acid, vinyl sulphonic acid, salts of vinyl sulphonic acid, vinylbenzene sulphonic acid, salts of vinylbenzene sulphonic acid, alpha-acrylamidomethylpropanesulphonic acid, salts of alpha-acrylamidomethylpropanesulphonic acid 2-sulphoethyl methacrylate, salts of 2-sulphoethyl methacrylate, acrylamido-2-methylpropanesulphonic acid (AMPS), salts of acrylamido-2-methylpropanesulphonic acid, and styrenesulfonate (SS), and salts of SS.

Part B of the copolymer is typically neutral in pH conditions of the formulation and comprises monomeric units deriving from neutral monomers that remain neutral whatever the pH. Suitable neutral monomers include, for example:

alkyl oxides, such as ethylene oxide, and propylene oxide, acrylamide, methacrylamide, amides of alpha-ethylenically-unsaturated, typically mono-alpha-ethylenically-unsaturated, monocarboxylic acids, esters of an alpha-ethylenically-unsaturated, typically mono-alpha-ethylenically-unsaturated, monocarboxylic acid, for example alkyl esters such as such as methylacrylate, ethylacrylate, n-propylacrylate, n-butylacrylate, methylmethacrylate, ethylmethacrylate, n-propylmethacrylate, n-butylmethacrylate, 2-ethyl-hexyl acrylate, or hydroxyalkyl esters such as 2-hydroxyethylacrylate, polyethylene and/or polypropylene oxide (meth)acrylates (i.e. polyethoxylated and/or polypropoxylated (meth)acrylic acid), vinyl alcohol, vinyl pyrrolidone, vinyl acetate, vinyl versatate, vinyl nitriles, typically comprising from 3 to 12 carbon atoms, acrylonitrile, vinylamine amides, vinyl aromatic compounds, such as styrene, and mixtures thereof.

In one embodiment, the polymer comprises a polycationic homopolymer, such as, for example, a poly(trimethylammonium ethyl acrylate methyl sulfate) homopolymer.

In one embodiment, the polymer is a block copolymer having cationic blocks and neutral blocks, such as for example, a poly(trimethylammonium ethyl acrylate methyl sulfate)-b-polyacrylamide) block copolymer.

In one embodiment, the polymer comprises a polyanionic homopolymer, such as, for example, a poly(styrene sulfonate) homopolymer.

In one embodiment, the polymer is a block copolymer having anionic blocks and neutral blocks, such as for example, a poly (styrene sulfonate)-b-polyacrylamide) block copolymer.

Parts that are ionic in the pH conditions of the formulation are usually considered as water-soluble. Thus, part A is usually considered as water-soluble. In a preferred embodiment of the invention, part B is water-soluble, or hydrophilic. Water-solubility of a part refers to the water-solubility that said part would have without the other part(s) that is the water-solubility of a polymer consisting of the same repeating units than said part, having the same molecular weight. By water-soluble part, polymer, it is meant that the part, polymer does not phase separate macroscopically in water at a concentration from 0.01% and 10% by weight, at a temperature from 20° C. to 30° C.

In one embodiment, the copolymer is made by anionic polymerization with sequential addition of 2 monomers as described for example by Schmolka, J. Am. Oil Chem. Soc. 1977, 54, 110; or alternatively Wilczek-Veraet et al., Macromolecules 1996, 29, 4036. Another method which can be used consists in initiating the polymerization of a part polymer at each of the ends of another part polymer as described for example by Katayose and Kataoka, Proc. Intern. Symp. Control. Rel. Bioact. Materials, 1996, 23, 899.

In one embodiment, the copolymer is made by living or controlled polymerization as defined by Quirk and Lee (Polymer International 27, 359 (1992)). Indeed, this particular method makes it possible to prepare polymers with a narrow dispersity and in which the length and the composition of the parts are controlled by the stoichiometry and the degree of conversion. In the context of this type of polymerization, there are more particularly recommended the copolymers which can be obtained by any so-called living or controlled polymerization method such as, for example:

free-radical polymerization controlled by xanthates according to the teaching of Application WO 98/58974 and U.S. Pat. No. 6,153,705, or free-radical polymerization controlled by dithioesters according to the teaching of Application WO 98/01478.

Block copolymers obtained by a living or controlled free-radical polymerization process may comprise at least one transfer agent group at an end of the polymer chain. In one embodiment, such a group is removed or deactivated subsequent to polymerization.

Living or controlled free-radical polymerization processes involve using a transfer agent, and implementing addition of different monomers to obtain block copolymers.

The preferred transfer agents for implementing the controlled polymerization process are dithioesters, thioethers-thiones, dithiocarbamates, or xanthates. The preferred polymerization is the living radical polymerization using xanthates.

While the terms "polymer" and copolymer" as used herein include oligomers, the weight average molecular weight of the polymer is more typically from about 1000 to about 500,000 g/mol. It is even more typically less than 100,000 g/mol, and still more typically from about 15,000 to 50,000 g/mol. Within these ranges, the weight ratio of each block may vary. It is however typical that each block has a molecular weight above 500 g/mol, and typically above 1000 g/mol.

A polymer solution in accordance with the invention may be prepared by adding the desired amount of polymers in a powder form to deionized water, typically having a conductivity of MΩ (Purification ion-exchange filter, Millipore). The polymer and water are typically mixed for about 24 hours to achieve homogeneity with a concentration typically in the range of between about 1% or less.

In one embodiment, the aqueous polymer solution or dispersion comprises from about 0.001 to about 5 wt %, more typically from about 0.01 to about 1 wt % of the polymer in an aqueous medium.

The aqueous medium in which the polymer is dissolved or dispersed typically comprises, as in the case of the above described aqueous medium of the slurry of nanoscale inorganic particles, at least 40 wt %, more typically at least 50 wt % water and even more typically at least 60 wt % water and may optionally further comprise one or more water miscible organic liquids, of the same type and in the same relative amounts as discussed above in regard to the aqueous medium of the slurry of nanoscale inorganic particles.

The pH of the aqueous polymer solution or dispersion may be any pH in which the components are not degraded, typically, a pH of from about 5 to about 9.

The monolayer of polymer is typically deposited on the layer of nanoscale inorganic particles by contacting the layer of nanoscale inorganic particles with the aqueous solution or dispersion of the polymer, such as for example, by immersing the nanoscale inorganic particles in the aqueous solution or dispersion of the polymer. The layer of nanoscale inorganic particles is typically contacted with the aqueous solution or dispersion of the polymer for a contact time of from greater than 0 seconds to about 30 minutes, more typically from about 1 second to about 10 minutes.

The layer of nanoscale inorganic particles is contacted with the aqueous solution or dispersion of the polymer at any temperature and pressure at which the aqueous medium does not evaporate at a high rate, typically, at temperature of from about 20° C. to about 40° C. at atmospheric pressure, more typically, at ambient temperature and atmospheric pressure.

The surface modified substrate may optionally be rinsed with water after discontinuing contact of the nanoscale inorganic particles with the aqueous solution or dispersion of the polymer. In general, the time period between discontinuing contact of the treated surface with the aqueous polymer solution or dispersion and rinsing the treated surface is not critical. In one embodiment, the treated surface is rinsed to remove any poorly adhered polymer from the treated surface. Typically, contact of the surface with the aqueous polymer solution or dispersion is discontinued and the surface is rinsed with the aqueous rinse solution immediately or substantially immediately after the contact of the surface with the aqueous polymer solution or dispersion is discontinued. Optionally, the treated surface may be allowed to dry during the time period after contact of the surface with the aqueous polymer solution or dispersion is discontinued and prior to rinsing.

As described above in the case of the nanoparticle sol treatment step, the aqueous rinse solution following the aqueous polymer solution or dispersion treatment step comprises water and may, optionally, further comprise up to about 70 wt %, more typically up to about 30 wt %, of a water miscible organic liquid.

The nanoparticle layer of the surface modified substrate of the present invention provides radiation absorbtion properties. The radiation absorbing properties of the layer can be tuned by selection of the inorganic particle component of the layer. For example, cerium oxide, TiO2, and $Fe_2O_3$, each absorb radiation in the ultraviolet range and a layer of cerium oxide, $TiO_2$, and/or $Fe_2O_3$, particles provides ultraviolet radiation absorbing properties. Radiation absorbing coatings are useful, for example, to protect an underlying substrate, such as a synthetic polymer substrate, from radiation, such as ultraviolet radiation.

In one embodiment, the article of the present invention imparts hydrophilic properties to a surface of a substrate made from a hydrophobic material.

The surface modified substrate of the present invention is useful as, for example, an article, such as a tube or a pipe, having a surface, such as the inner surface of a tube or pipe, having anti-fouling properties or as an article, for example, a kitchen or bathroom counter surface, having anti-soiling properties and/or water-sheeting, that is, hydrophilic, properties.

Example 1

Thin silicon wafers (from Wafer World Inc, 1 side polished, (100) are covered with a native silicon oxide ($SiO_2$) layer of approximately 2 nm (by ellipsometry). The substrate was dipped into a 0.1 wt % aqueous sol of nanoscale cerium oxide particles at pH about equal to 1.5 for 10 minutes. The cerium oxide particles of the sol exhibited an average particle size of about 10 nanometers by dynamic light scattering measurement. The pH was then increased to pH about equal to 10 by adding $NH_4OH$. The substrate was then rinsed thoroughly with pure deionized water to remove any non-adsorbed material. The substrate was then dried under nitrogen flow and contact angles were measured.

Advancing contact angles ($\theta_a$) were around 450. Receding contact angles ($\theta_r$) were below 15-200. AFM (atomic force microscopy) and ellipsometry measurements have shown that the layer was indeed a homogenous monolayer of nanoceria (thickness about equal to 6-10 nm). After 1 month, the contact angles remained the same (($\theta_a$ about equal to 45°, $\theta_r$ about equal to 15-200).

Example 2

Polystyrene is an amorphous, glassy ($T_g \approx 100°$ C.) and hydrophobic ($\theta_a \approx 90°$) polymer. Spin-coating was used to obtain a smooth model polystyene layer (RMS about equal to 1 nm on 1×1 $\mu m^2$ area) from an organic solution (2.5 wt % in toluene) onto a silicon wafer. Final thickness was about 100 nm.

The samples of polystyrene coated substrate were treated with nanoceria according to the same procedure as described above in Example 1.

Advancing contact angles ($\theta_a$) were around 45°. Receding contact angles ($\theta_r$) were below 15-20. AFM measurements have shown that the layer was indeed a homogenous monolayer of nanoceria (thickness about equal to 6-10 nm). After 1 month, the contact angles remained the same (($\theta_a$ about equal to 45°, $\theta_r$ about equal to 15-200).

Example 3

Polypropylene is a semi-crystalline, rubbery ($T_g$ about equal to −20° C.) and hydrophobic ($\theta_a \approx 105°$) polymer. Spin-coating was used to obtain a smooth model polypropylene layer (RMS about equal to 2 nm on 1×1 $\mu m^2$ area) from an organic solution (2.5 wt % in hot xylene) onto a silicon wafer. Final thickness was about 100 nm.

The samples of polypropylene coated substrate were treated with nanoceria according to the same procedure as described above in Example 1.

Advancing contact angle ($\theta_a$) were around 450. Receding contact angles ($\theta_r$) were below 15-200. AFM measurements have shown that the layer was indeed a homogenous monolayer of nanoceria (thickness about equal to 6-10 nm). After 1 month, the contact angles remained the same ($\theta_a$ about equal to 45°, $\theta_r$ about equal to 15-200).

Example 4

Pure ethanol (pH about equal to 9.8) was acidified by adding $HNO_3$ to a pH about equal to 1.5. A 1 wt % sol of nanoscale cerium oxide particles dispersed in water (pH about equal to 1.5) was diluted with the previous ethanol solution to get a 50:50 volume:volume sol at a cerium oxide particle concentration of 0.1 wt %. The cerium oxide particles of the sol exhibited an average particle size of about 10 nanometers by dynamic light scattering measurement. Such a sol has a surface tension of about 30 milliNewtons per meter (mN/m) (pure water being about 72 mN/m).

Polyethylene sheets (2 cm×1 cm×1 mm) were dipped in the sol (because polyethylene has a critical surface tension $\gamma_c$ of about 32 nm/m, the solution completely wet the substrate) and withdrawn after 10 seconds and then immediately dipped into pure deionized water (pH about equal to 6) to precipitate the sol. The substrate was then rinsed thoroughly and dried under a nitrogen flow. Contact angles were measured the following day. Advancing contact angles ($\theta_a$) were about 45°. Receding contact angles ($\theta_r$) were below 15-20°.

Example 5

A 0.1 wt % sol of nanoscale cerium oxide particles dispersed in deionized water was prepared and acidified to pH 1.5 with nitric acid. The cerium oxide particles of the sol exhibited an average particle size of about 10 nanometers by dynamic light scattering measurement The solution was further modified by the addition of 0.1 M sodium nitrate. Addition of salt did not change the dispersability of the nanoparticles. Polycarbonate sample plaques were treated by submerging the plaques in the dispersion for 1 hour. These plaques were then removed from the solution and rinsed in deionized water. After rinsing the substrate was air dried and the hydrophilicity of the treated surfaces of the plaques was tested using contact angle measurements.

Receding contact angle ($\theta_r$) of water on polycarbonate plaques treated with cerium oxide nanoparticles in the presence of $NaNO_3$ was 390 while the receding contact angle of water on untreated polycarbonate plaques was 600.

Example 6

A 0.1 wt % sol of nanoscale cerium oxide particles dispersed in deionized water was prepared and acidified to pH 1.5 with nitric acid. The cerium oxide particles of the sol exhibited an average particle size of about 10 nanometers by dynamic light scattering measurement The solution was further modified by the addition of 0.1 M sodium nitrate. Addition of salt did not change the dispersability of the nanoparticles. Nylon 6,6 sample plaques were treated by submerging the plaques in the dispersion for 1 hour. These plaques were then removed from the solution and rinsed in deionized water. After rinsing the substrate was air dried and the hydrophilicity of the treated surfaces of the plaques was tested using contact angle measurements.

Receding contact angle ($\theta_r$) of water on Nylon 6,6 plaques treated with cerium oxide nanoparticles in the presence of $NaNO_3$ was 24° while the receding contact angle of water on untreated Nylon 6,6 plaques was 53°.

Treatment of Nylon 6,6 plaques in an analogous manner with a cerium oxide nanoparticle sol that lacked the $NaNO_3$ salt component resulted in no change in the receding contact angle of water on the treated plaques compared to receding contact angle of water on untreated plaques.

Example 7

A 0.1 wt % sol of nanoscale cerium oxide particles dispersed in deionized water was prepared and acidified to pH 1.5 with nitric acid. The cerium oxide particles of the sol exhibited an average particle size of about 10 nanometers by dynamic light scattering measurement The solution was further modified by the addition of 0.1 M sodium nitrate. Addition of salt did not change the dispersability of the nanoparticles. Teflon sample plaques were treated by submerging the plaques in the dispersion for 1 hour. These plaques were then removed from the solution and rinsed in deionized water. After rinsing the substrate was air dried and the hydrophilicity of the treated surfaces of the plaques was tested using contact angle measurements.

Receding contact angle ($\theta_r$) of water on Teflon plaques treated with cerium oxide nanoparticles in the presence of $NaNO_3$ was 51° while the receding contact angle of water on untreated Teflon plaques was 85°.

Treatment of Teflon plaques in an analogous manner with a cerium oxide nanoparticle sol that lacked the $NaNO_3$ salt component resulted in no change in the receding contact angle of water on the treated plaques compared to the receding contact angle of water on untreated plaques.

Example 8

A polystyrene surface was treated with inorganic cerium oxide particles as follows. A 0.1 wt % sol of nanoscale cerium oxide ($CeO2$) particles dispersed in deionized water was prepared and acidified to pH 1.5 with nitric acid. The cerium oxide particles of the sol exhibited an average particle size of about 10 nanometers by dynamic light scattering measurement. The solution was further modified by the addition of 0.1 M sodium nitrate. Addition of salt did not change the dispersability of the nanoparticles.

Polystyrene is an amorphous, glassy ($T_g \approx 100°$ C.) and hydrophobic ($\theta_a \approx 90°$) polymer. Spin-coating was used to deposit a smooth model polystyrene surface (RMS about equal to 1 nm on 1×1 $\mu m^2$ area) from an organic solution (2.5 wt % in toluene) onto a silicon wafer. Final thickness was about 100 nm.

The polystyrene surface was then dipped into the above nanoceria solution for 10 nm. The substrate was then rinsed thoroughly with deionized water to remove any non-adsorbed material. The substrate was then dried under nitrogen flow and contact angles were measured. Advancing contact angles ($\theta_a$) were about 45°. Receding contact angles ($\theta_r$) were below 15. Atomic Force Microscopy measurements indicated that the layer was a homogenous monolayer of nanoceria having a thickness about equal to 6-10 nm. After 1 month, the contact angles remained the same ($\theta_a$ about equal to 45°, $\theta_r$ about equal to 15-200).

The nanoscale $CeO_2$ particle-treated polystyrene surface was then treated with a 0.1% by weight aqueous solution at a pH between about 5 and about 7 of a block copolymer having anionic blocks and neutral blocks (a poly(styrene sulfonate)-b-polyacrylamide) block copolymer) having a weight average molecular weight of 7K-30K g/mol.

Light reflectance measurements were carried out to monitor absorbtion of the block copolymer onto the nanoscale $CeO_2$ particle-treated polystyrene surface. Details of the light reflectance technique are described by (Dijt, J. C.; Cohen Stuart, M. A.; Fleer, G. J.; "Reflectometry as a tool for adsorption studies"; Adv. Colloid. Interface. Sci. 1994, 50, 79). In this measurement, a polystyrene functionalized surface was first equilibrated in deionized water in a glass cell having an internal volume of 5 cubic centimeters for approximately 10 minutes to generate a flat baseline. After equilibration, a 0.1 wt % aqueous solution of the poly(styrene sulfonate)-b-polyacrylamide) block copolymer was introduced to the cell and the adsorption of copolymer on the surface was measured as a function of time.

After 1 minute of contact time, the amount Γ of block copolymer adsorbed on the surface reached a plateau value around 5 $mg/m^2$. This high value for organic matter indicates that the surface was fully covered. A flow of deionized water (flow rate of 10 milliliters per hour) was then injected into the cell for 10 minutes. The adsorbed amount F remained constant over the duration of the deionized water flow. This result shows that the adsorbed copolymer layer was strongly bound to the nanoscale $CeO_2$ particle-treated polystyrene surface.

An analogous experiment was run using a 0.1% by weight aqueous solution of a block copolymer having cationic blocks and neutral blocks (a poly(trimethylammonium ethyl acrylate methyl sulfate)-b-polyacrylamide) block copolymer) having a weight average molecular weight of 7K-30K g/mol in place of the anionic-neutral block copolymer solution, in which case the results showed no evidence of any absorbtion of the cationic-neutral block copolymer onto the nanoceria treated surface.

A 100 part per million ("ppm") aqueous solution of lysozyme protein was then introduced into the cell. Adsorption of the protein was monitored using the a light reflectance technique analogous to that described above. No noticeable change of was recorded after 10 minutes of contact time indicating that the protein did not adsorb onto the block copolymer and nanoscale $CeO_2$ particle-treated polystyrene surface. In contrast, contact of a non-treated polystyrene surface with the protein solution resulted in the adsorption of about 2 $mg/m^2$ of protein onto the non-treated polystyrene surface. These results show that the poly(styrene sulfonate)-b-polyacrylamide) block copolymer and nanoscale $CeO_2$ particle treatments were effective in providing anti-fouling properties to the polystyrene surface, that is, poly(styrene sulfonate)-b-polyacrylamide) block copolymer and nanoscale $CeO_2$ particle layers on the polystyrene surface were effective in preventing protein adsorption.

The invention claimed is:

1. A surface modified substrate, comprising:
   (a) a substrate having a surface,
   (b) a monolayer consisting of nanoscale inorganic oxide particles disposed directly on at least a portion of the surface of the substrate, said layer of nanoscale inorganic oxide particles comprising sites that bear an electric charge of a first polarity, the monolayer of nanoscale inorganic particles has a first surface in contact with the surface of the substrate and a second surface oriented away from the surface of the substrate; and
   (c) a monolayer of a polymer disposed on and adhered to a least a portion of the monolayer of nanoscale inorganic oxide particles, said monolayer of copolymer comprising sites that bear an electric charge of a second polarity, wherein the second polarity is the opposite of the first polarity, the monolayer of polymer has a first surface in contact with the second surface of the layer of nanoscale inorganic oxide particles and a second surface oriented away from the layer of nanoscale inorganic oxide particles.

2. The surface modified substrate of claim 1, wherein the substrate is an organic polymer an organosilicon polymer, a ceramic, a metal, a composite material, or an inorganic material other than a ceramic or metal.

3. The surface modified substrate of claim 1, wherein the nanoscale inorganic oxide particles comprise cerium oxide, titanium oxide, zirconium oxide, hafnium oxide, tantalum oxide, tungsten oxide and bismuth oxide, zinc oxide, indium oxide, silica, tin oxide, or iron oxide.

4. The surface modified substrate of claim 1, wherein the polymer is a copolymer comprising at least two parts, A and B, wherein part A is polyionic and part B is neutral under ambient pH conditions.

5. The surface modified substrate of claim 1, wherein the electrically charged sites of the layer of nanoscale inorganic particles have a negative polarity and the electrically charged sites of the monolayer of polymer have a positive polarity and the monolayer of polymer is continuous.

6. The surface modified substrate of claim 1, wherein the electrically charged sites of the layer of nanoscale inorganic particles have a positive polarity and the electrically charged sites of the monolayer of polymer have a negative polarity and the monolayer of polymer is continuous.

7. The surface modified substrate of claim 1, wherein the nanoscale inorganic particles are nanoscale cerium oxide particles.

8. The surface modified substrate of claim 1, wherein the polymer is a poly (styrene sulfonate)-b-polyacrylamide) block copolymer.

9. A method for modifying the surface of a substrate, comprising the steps of:
   a) treating at least a portion of such surface with a slurry of nanoscale inorganic oxide particles to deposit a monolayer consisting of such nanoscale inorganic oxide particles directly on such portion of such surface, wherein the nanoscale inorganic oxide particles have a first net electrical charge, the monolayer of nanoscale inorganic particles has a first surface in contact with the surface of the substrate and a second surface oriented away from the surface of the substrate; and
   b) treating the nanoscale inorganic oxide particle-treated surface with an aqueous solution or dispersion of a polymer, said polymer having a second net electrical charge, at a pH wherein the polarity of the second net electrical charge is the opposite of polarity of the first net electrical charge to deposit a monolayer of the polymer on the monolayer of nanoscale inorganic oxide particle-treated surface, the monolayer of polymer has a first surface in contact with the second surface of the layer of nanoscale inorganic oxide particles and a second surface oriented away from the layer of nanoscale inorganic oxide particles.

10. The method of claim 9, wherein the slurry is initially a stable dispersion nanoscale inorganic oxide particles in an aqueous medium, and the surface is treated by contacting the surface with the slurry and adjusting the pH of the slurry while the surface is in contact with slurry to precipitate nanoscale inorganic oxide particles from the slurry.

11. The method of claim 10, wherein the slurry comprises a stable dispersion of nanoscale inorganic oxide particles in an aqueous medium, the aqueous medium comprises a dissolved electrolyte, and the surface is treated by contacting the surface with the slurry and then discontinuing the contacting of the surface with the slurry.

12. The method of claim 9, wherein nanoscale inorganic particles comprise cerium oxide particles.

13. The method of claim 11, wherein the aqueous medium comprises from about 0.01 to about 0.1 percent by weight of the electrolyte.

14. The method of claim 13, wherein the electrolyte comprises a nitrate salt.

15. The method of claim 9, further comprising rinsing the nanoscale inorganic oxide particle-treated surface with an aqueous rinse solution after discontinuing contacting of the surface with the stable slurry.

16. The method of claim 9, wherein the polymer comprises copolymer having at least two parts, A and B, wherein part A is polyionic and part B is neutral under the pH conditions of said solution or dispersion.

17. The method of claim 16, wherein nanoscale inorganic particles comprise cerium oxide particles and the polymer is a poly(styrene sulfonate)-b-poly(acrylamide) block copolymer.

* * * * *